(12) United States Patent
Rauch et al.

(10) Patent No.: US 6,338,455 B1
(45) Date of Patent: Jan. 15, 2002

(54) HEATING DEVICE WITH RESISTIVE ELEMENTS FOR AN AERODYNAMIC PROFILE

(75) Inventors: Patrice Rauch, Fuveau; Jean-Cyril Bauchet, Montgeron, both of (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/318,364

(22) Filed: May 25, 1999

(30) Foreign Application Priority Data

May 27, 1998 (FR) .......................................... 98 06655

(51) Int. Cl.⁷ .............................................. B64D 15/00
(52) U.S. Cl. ................................ 244/134 D; 244/134 R
(58) Field of Search ....................... 244/134 R, 134 D; 219/202, 520, 542, 552, 545

(56) References Cited

U.S. PATENT DOCUMENTS

| | | | |
|---|---|---|---|
| 2,590,944 A | * | 4/1952 | Cowdrey et al. |
| 2,686,640 A | * | 8/1954 | Neel et al. |
| 2,757,273 A | * | 7/1956 | Taylor |
| 3,022,412 A | * | 2/1962 | Waters |
| 3,420,476 A | * | 1/1969 | Volkner et al. |
| 4,021,008 A | | 5/1977 | Eichenauer |
| 4,410,794 A | | 10/1983 | Williams |
| 4,814,931 A | * | 3/1989 | Kugelman et al. |
| 5,351,918 A | | 10/1994 | Giamati |
| 5,657,951 A | * | 8/1997 | Giamati |
| 5,947,418 A | * | 9/1999 | Bessiere et al. |
| 5,971,323 A | * | 10/1999 | Rauch et al. |

\* cited by examiner

*Primary Examiner*—Charles T. Jordan
*Assistant Examiner*—Tien Dinh
(74) *Attorney, Agent, or Firm*—Piper Marbury Rudnick & Wolfe

(57) ABSTRACT

This concerns a heating device for an aerodynamic profile (10) including, incorporated into the aerodynamic profile near the leading edge (6) of the aerodynamic profile, several resistive elements forming a first set (18) of resistive elements (14,15) running approximately parallel to the leading edge, arranged in a way to form a de-icing circuit. The device includes in addition a second set (19) of resistive elements (16,17) incorporated into the aerodynamic profile and arranged as an anti-icing circuit. The two circuits (18,19) are independent and the relative positions of their elements are a function of the design of the profile.

12 Claims, 6 Drawing Sheets

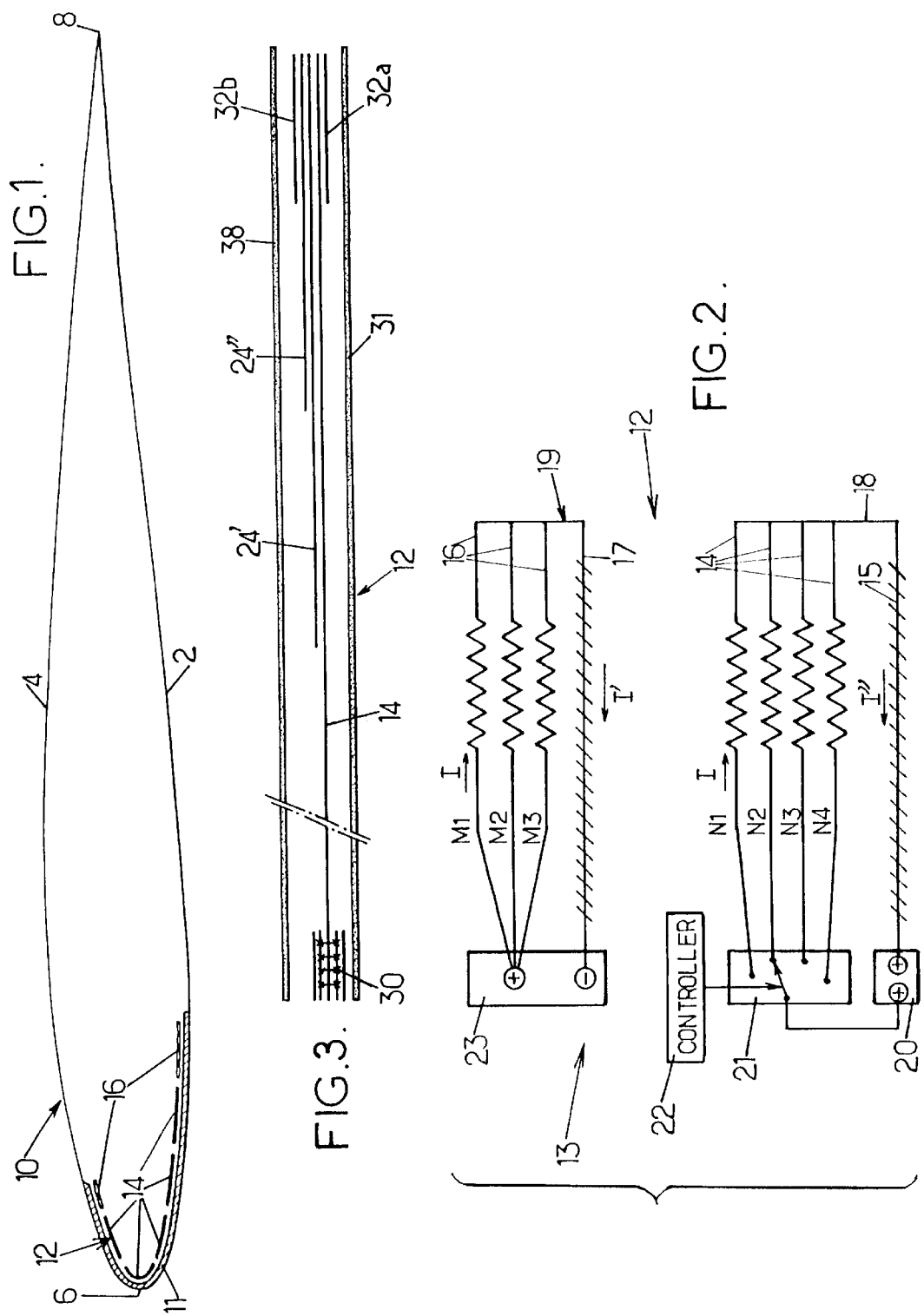

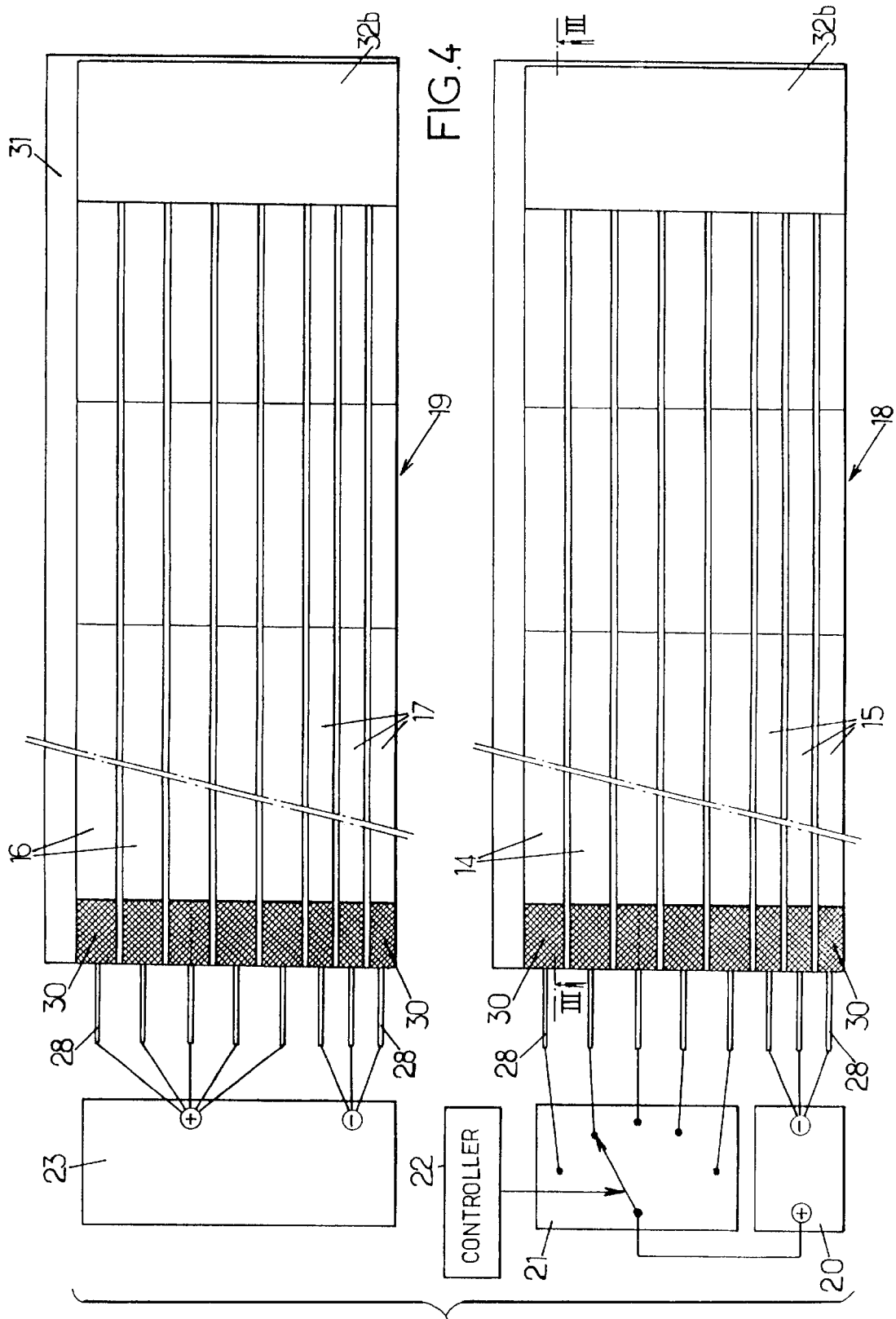

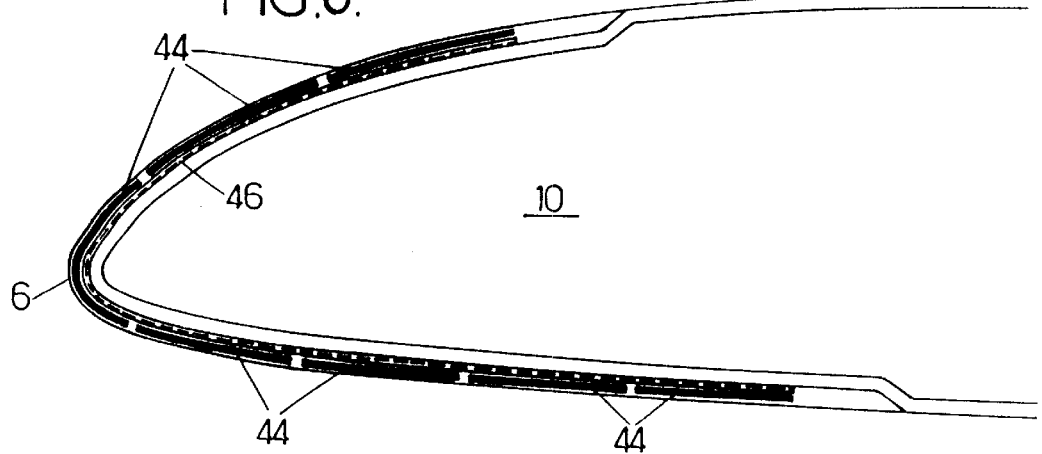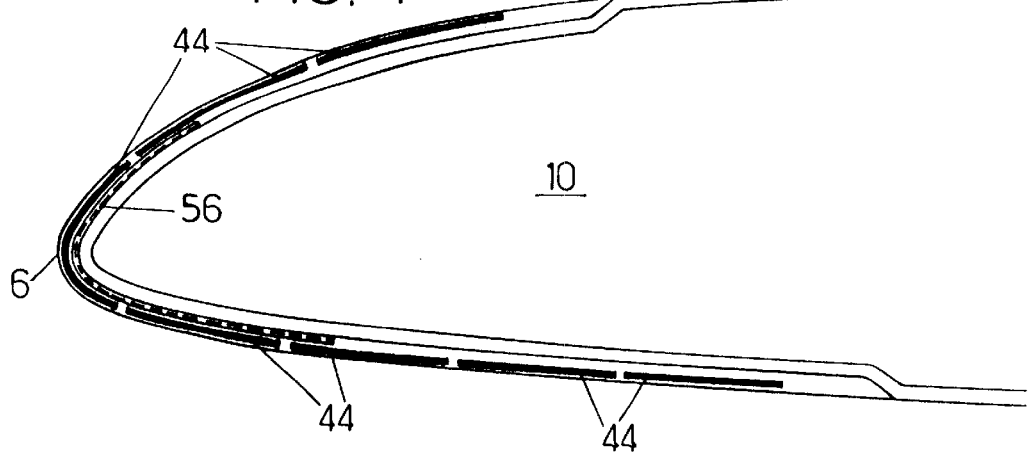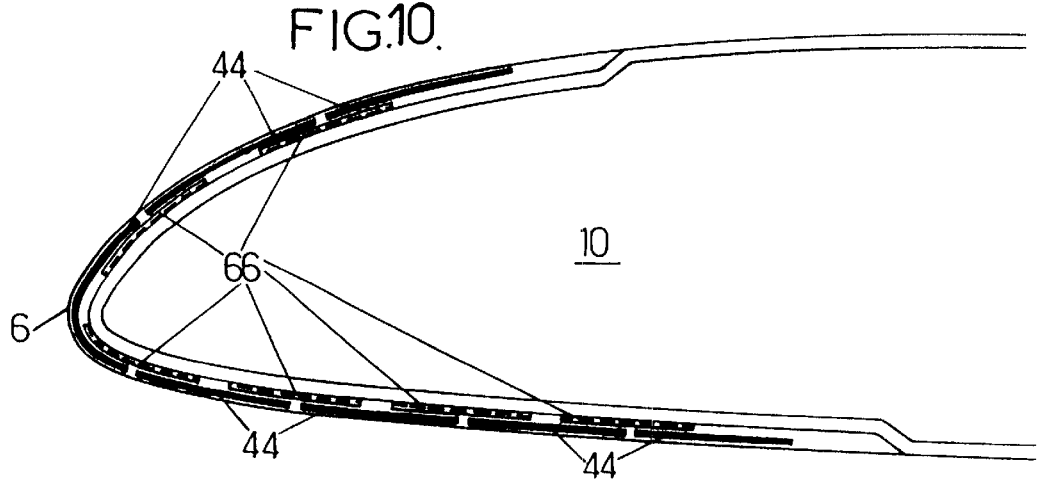

HEATING DEVICE WITH RESISTIVE ELEMENTS FOR AN AERODYNAMIC PROFILE

FIELD OF THE INVENTION

The present invention concerns a heating device for an aerodynamic profile. More particularly, the profiles concerned are those for which the aerodynamic shape must not be disturbed by the formation of ice, especially helicopter blades (main rotor or tail rotor), or alternatively aircraft wings.

BACKGROUND OF THE INVENTION

The problem of icing on such profiles is well known in the aeronautics industry. The shape of the aerodynamic profiles can be modified because of the formation of ice resulting from the undercooling of water droplets contained in the atmosphere which the profile encounters in flight.

This problem is often treated by equipping the profile with a Joule effect heating structure.

Most often, the heating device comprises, incorporated into the aerodynamic profile in the vicinity of a leading edge of the aerodynamic profile, several resistive elements forming a first resistive element set running approximately parallel to the leading edge, each of the said resistive elements being provided at its proximal end with means of connection to an electrical supply, so-called first electrical supply, the device comprising in addition a cyclical supply control to supply, from the aforesaid first electrical supply, at least some of the resistive elements of the first set, one after the other, according to a specified sequence so that the first set of resistive elements forms a de-icing circuit.

The resistive elements of such a heating device, when they are supplied in an intermittent way, dissipate the heat to eliminate the ice which forms regularly on the aerodynamic profile of the leading edge. They have thus a curative action that does not consume very much electrical power and is beneficial in de-icing large surfaces.

However, in the event of failure of the de-icers, the aerodynamic profiles of helicopter blades are no longer protected against ice. Their effectiveness then decreases rapidly with the formation of ice, increasing the risk of accident. In addition, the de-icers have only a curative action, they do not prevent the formation of ice in a preventative manner when the helicopter is placed in very strong icing conditions.

SUMMARY OF THE INVENTION

The object of the invention is to propose a heating device that permits freedom from the limitations of the de-icers mentioned above.

To this end, according to the invention, a heating device for an aforementioned aerodynamic profile, is essentially characterised in that it includes a second set of resistive elements incorporated into the aerodynamic profile in the vicinity of the leading edge of the aerodynamic profile and running approximately parallel to the leading edge, each of the said resistive elements being provided at its proximal end with means of connection to a second electrical supply, all the resistive elements of the second set being collectively and selectively supplied by the second electrical supply so that the second set of resistive elements forms an anti-icing circuit, and in that the distal ends of each of the resistive elements of the first and second sets are connected by electrical returns to the first and second electrical supplies, the electrical returns of the first set being independent of the electrical returns of the second set.

In this way, the aerodynamic profile of a blade fitted with such a heating device is provided with means of de-icing and means of anti-icing which provide at the same time a curative and preventative action against the formation of ice. These systems are moreover redundant. In this way, in the event of failure of one of the circuits, the other circuit ensures that the risks of incident are limited.

The heating device, according to the invention, can possibly comprise in addition one or several of the following characteristics:

- the resistive elements of the first set and/or the resistive elements of the second set are made in a metallic material;
- the resistive elements of the first set and/or the resistive elements of the second set are made of electrically conducting fibres of composite material running approximately parallel to the leading edge of the profile;
- the resistive elements of the first set and of the second set are arranged one beside the other in a heating mat that covers the vicinity of the leading edge, at least one resistive element of the second set being located along a lateral edge of the heating mat;
- the second set comprises at least one resistive element located along a lateral edge of the heating mat and at least one resistive element located along the opposite lateral edge of the heating mat;
- the resistive elements of the first set and the resistive elements of the second set are arranged one beside the other in a heating mat covering the vicinity of the leading edge, at least one element of the second set being located closer to the leading edge than the elements of the first set;
- the elements of the first set are arranged one beside the other in a heating mat covering the vicinity of the leading edge, and at least one resistive element of the second set is superimposed on the elements of the first set in the heating mat;
- the said second set is composed of a resistive element covering approximately all the width of the heating mat, by superposition of the resistive elements of the first set;
- at least one resistive element of the second set is superimposed on a part of the width of the heating mat located at right angles to the leading edge;
- at least one resistive element of the second set is placed so as to cover a gap separating two adjacent resistive elements of the first set;
- at least some of the returns of the first set of resistive elements are electrically connected to one another, these returns being made of metallic material or made of electrically conducting fibres of composite material; and
- the electrical returns connected to one another of the first set are arranged on the aerodynamic profile, approximately in the same way as the resistive elements of the second set.

In this way, according to the number and the relative value of the resistance of the resistive elements of the first and second sets, greater importance can be given to the de-icing or the anti-icing function. This makes the best compromise to be made, in each particular case, between the effectiveness against the formation of ice and the electrical consumption.

When the resistive elements are not highly mechanically loaded, i.e. when the blade is lightly loaded by vibratory fatigue stresses, these resistiveelements can be metallic. The thickness of these elements is then advantageously small, and they are easy to incorporate into the blade.

On the contrary, when the blade is highly loaded by fatigue stresses, the resistive elements of both sets are preferably each made from conducting fibres, typically made of carbon, running parallelly to the leading edge of the profile and this all the more advantageous if the blade is itself of composite material. Achieving this carbon or similar base fibre de-icing/anti-icing has a certain number of advantages:

- a major advantage is relative to its mechanical integrity, and therefore to its life span. This mechanical resistance is obtained by the use of composite materials based on carbon fibres, whose static and fatigue resistance properties under the flexing sustained in flight reaches high levels. This characteristic makes it possible to provide de-icers/anti-icers, whose life span is compatible with that of the structure of the blade;
- in addition, each resistive element is a layer consisting of multiple carbon filaments, all conductors of current, and thus ensuring a multiple redundancy in the event of rupture of one of the filaments;
- the composite/composite bond between the carbon fibre based device and the blade is of very high quality over time;
- the carbon fibres of the resistive elements contribute to the rigidity of the blade. As these fibres are very close to the leading edge, their contribution to the drag stiffness (proportional to the square of the distance from the neutral axis) is particularly appreciable. It facilitates the lightening, or even the removing, the ledge of the trailing edge generally responsible for part of the drag forces, which has the disadvantage of increasing the mass of the blade and moving back the position of its centre of gravity;
- the carbon fibre based device is heated in a more homogeneous manner over all its surface;
- the structure of the composite de-icer is flexible before polymerisation and can therefore be shaped and laid up over wide irregular and changing surfaces. On the contrary, it becomes stiff and solid after polymerisation (handling advantage, ease of covering, risk of defects reduced, quality increased, etc.);
- the risk of corrosion is eliminated or at least reduced.

BRIEF DESCRIPTION OF THE DRAWINGS

Other specific features and advantages of the present invention will appear in the description below of non-restrictive examples achieved by reference to the appended drawings, in which:

FIG. 1 is a schematic sectional view of an aerodynamic profile fitted with a heating device according to the present invention;

FIG. 2 is a schematic view of the heating device according to the present invention fitting the aerodynamic profile of FIG. 1;

FIG. 3 shows a longitudinal section of a resistive element forming a part of a device according to the invention, taken along the plane III-III shown in FIG. 4;

FIG. 4 is an exploded view of the heating device of FIG. 1, with a schematic representation of the associated supply and control means;

FIGS. 8 to 14 are transverse section diagrammatic views showing the leading edge of an aerodynamic profile fitted with other examples of the heating device made according to the invention.

DETAILED DESCRIPTION OF THE PREFERRED EMBODIMENTS

Figure 5:
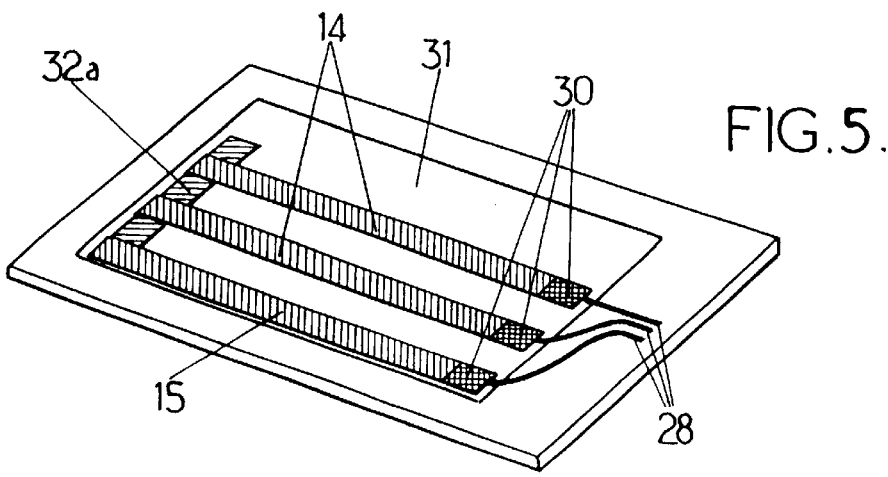
FIGS. 5 to 7 are perspective diagrams illustrating the manufacture of the heating device.

FIG. 1 shows schematically in transverse section an aerodynamic profile 1 which constitutes a helicopter blade, for example the main rotor. The numerical references 2, 4, 6 and 8 designate respectively the intrados, the extrados, the leading edge and the trailing edge of the blade 10.

The blade is made of composite material, and a metallic shield 11 covers the vicinity of its leading edge 6 for protection against impacts. Immediately behind the shield 11 is a heating mat 12 of the heating device 13 according to the present invention. This heating mat comprises several resistive elements 14, 16 that run longitudinally along the span of the blade, i.e. parallel with the leading edge 6.

The heating device 13, diagrammatically shown in FIG. 2, includes a de-icing circuit 18 and an anti-icing circuit 19.

The de-icing circuit 18 is made of N resistive elements 14 which are cyclically supplied with current I by a first supply 20 which is connected to a commutator 21 controlled by a de-icing controller 22. The current I is returned to the supply 20 by one or more returns 15 that are connected at the distal ends of the resistive elements 14. These returns 15 are passed through by a current I".

The anti-icing circuit 19 is made of M resistive elements 16 which are collectively supplied all together or not at all with current I by a second electrical supply 23, the current I is returned to the electrical supply 23 through one or several returns 17 which are connected at the distal ends of the resistive elements 16. The returns 17 are passed through by a return current I'. For clarity, the returns 15 and 17 of both circuits 18 and 19 have not been shown in FIGS. 1 and 8 to 14.

The two de-icing 18 and anti-icing 19 circuits thus form two distinct circuits whose the relative positions of the resistive elements 14 and 16 can be adapted to the stresses undergone by the helicopter blade which supports them, in a way which will be described below.

When the blade is lightly loaded with vibratory fatigue stresses, the resistive elements 14 and 16 are mechanically lightly loaded and can then be metallic. These elements are then small, which is an advantage.

On the contrary, when the blade is highly loaded with fatigue stresses, the resistive elements of the two sets are preferably each made of conducting fibres, typically made of carbon, running parallel to the leading edge of the profile.

So as to optimise the electrical power supplied by the two electrical supplies 20 and 23, the returns 15 and 17 of each of the circuits 18 and 19 can be made of resistive elements, and not simply from a braid or from a foil, the nature of whose material is identical to the resistive elements 14 and 16.

In the case where the returns 15 and 17 are resistive elements, the heating mat 12 is then made of a first set of resistive elements 14, 15 and from a second set of resistive elements 16, 17. The resistive elements 14 of the first set are supplied in an intermittent manner to provide a de-icing type of function, whereas the resistive return elements 15 are supplied continuously, when the device is in use, to provide an anti-icing type of function. The second set is made of resistive elements 16, 17 which are together continuously supplied, when the atmospheric conditions require it, to provide an anti-icing type of function.

In this way, the heating mat 12 is formed from redundant sets. Indeed, in the event of failure of the first de-icing set, which has also a secondary anti-icing function, the second set provides the anti-icing function.

In comparison with FIGS. 3 to 7 is described an example of heating mat 12 the resistive elements 14 to 17 of which are constituted by layers of conducting fibres (carbon) running longitudinally to the span of the blade.

The resistive elements 14, 15 on the one hand and 16, 17 on the other hand are made and connected together in the same way. The connections to the first electrical supply 20 and to the second electrical supply 23 are different. In addition only the composition of the first set of resistive elements 1, 15 is described.

At its proximal end (towards the rotor hub) each resistive element 14, 15 is connected to a supply conductor 28 by means of a sheath 30 in the shape of a metal mesh. The sheath 30 surrounds the proximal end of the carbon resistive element over a length of about 50 mm for example, and it traps the conductor 28 to ensure the electrical contact. At their distal ends, the resistive elements 14, 15 are in electrical contact with each other. For this purpose, carbon fibre conducting layers 32a, 32b running transversely to the leading edge are in contact with the distal ends of the resistive elements 14, 15.

Figure 6:
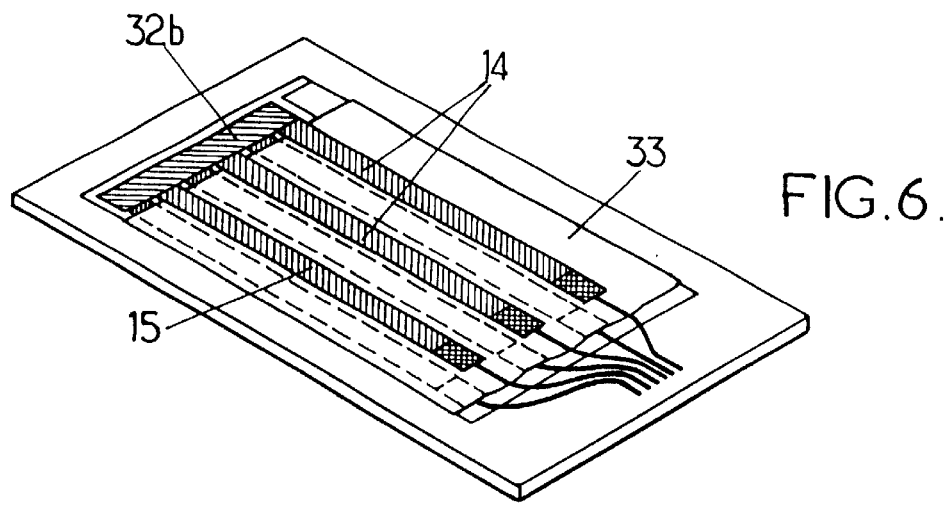
Figure 7:
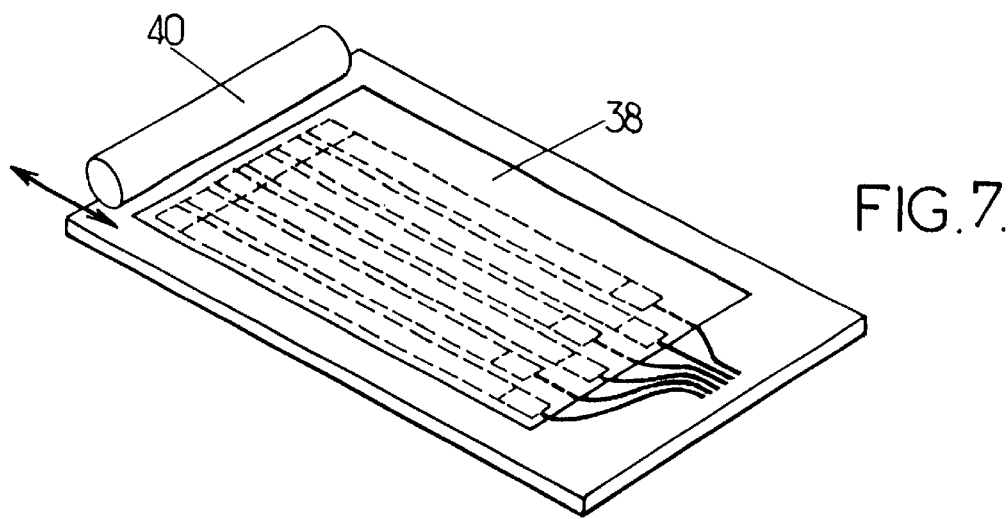

The heating mat is for example manufactured flat, using the process described in the French patent 2 578 377. FIGS. 5 to 7 illustrate the successive stages of the manufacture of this mat. In a first stage, a lower skin 31 of the mat, made for example by two layers of fibreglass fabric orientated at 45° to each other, is placed on a support. The layer of transverse fibres 32a is then placed at the distal end of the mat, followed by half of the longitudinal resistive elements 14,15 (every second element along the width of the mat). The layers constituting these resistive elements can be unwound from carbon fibre reels. Referring to FIG. 3, each resistive element is composed, for example, from nine layers of carbon fibres completed by a tenth layer 24" and an eleventh layer 24" towards the distal end in order to obtain a lower local resistive, and therefore a less significant thermal dissipation, towards the distal end of the blade where the risks of icing are less significant in the particular case considered (the variation of the power dissipated can in some cases be reversed). After having unwound the layers of carbon fibres that form elements 14, 15, the proximal end of each of these elements is fitted with its metallic flexible sheath 30 and with its supply conductor 28. The mat is then in the state shown in FIG. 5.

Then the mat is covered (except for its distal end) with an insert insulating wad 33, not shown in FIGS. 3 and 4, but visible in FIG. 6. This wad 33 can consist of several superimposed layers of fibreglass fabric, which mutually insulate the resistive elements and hold them in position. Then the remaining resistive elements 14, 15 are arranged by fitting them with their sheath and with their respective supply conductors. After having positioned the other transverse conducting fibre layer 32b, the mat is in the state shown in FIG. 6.

To complete the assembly of the heating mat, the upper skin 38, which has an identical composition to that of the lower skin 31, is placed. Then a compacting roll 40 is passed over the assembled mat to give it a certain amount of mechanical integrity (the fiberglass fabrics 31, 33, 38 are pre-impregnated with resin), and to provide a good electrical contact between the metallic sheaths 30 and the corresponding resistive elements (FIG. 7).

In order to shape the mat thus pre-compacted, two options are available. The first option consists in shaping the mat on a mandrel reproducing the shape near the leading edge, and in polymerizing the resin on this mandrel, possibly with the shield 11. The component thus obtained can then be bond to the blade made elsewhere. The second option consists in polymerizing the resin directly during the moulding of the blade, in the same mould.

In order to reduce the electrical resistance of the layers of the transverse fibres located at the distal end, the overall thickness can be increased. In this case, it is wise to provide more than two layers 32a, 32b and to sandwich some of these layers between the longitudinal fibre layers of the resistive elements. This operation does not pose any difficulty. It is sufficient to unwind the carbon fibres in the appropriate order.

In this way, the resistive elements 14, 15 of the first circuit 18 of the heating mat 12 are split into two sets. The first set is composed of N resistive elements marked 14 ($N \geq 2$) used for the flow of heating current in one direction, for example from the root of the blade to the distal end. The second set includes the resistive element(s) marked 15, for the flow of the current in the other direction. The supply conductors 28 of the resistive elements 15 are thus connected collectively to one of the terminals of the first electrical supply 20 of the aircraft (FIG. 4).

The resistive elements 14 of the first set are cyclically supplied in turn from the other terminal of the first supply 20. This power distribution is shown schematically by the commutator 21 in FIG. 4. The commutator 21 is controlled by a de-icing controller 22 which can be a processor programmed to apply pre-specified heating cycles. These cycles define the sequences in which the elements 14 of the first set are powered, the elements 15 of the second set being used collectively, in parallel, as a return path for the electricity to the first supply 20. This supply 20 can be a direct current or an alternating single- or multi-phase supply. When programming the controller 22, several different heating cycles can be provided which, in service, and can be selected according to manual control of the pilot or according to the measurement of parameters such as the external temperature. The supply can of course be controlled by power regulation (parts not shown). In the standard way, the connections between the conductors 28 mounted on the blade and the supply on board the aircraft are made by means of rotating contacts which are not shown.

The resistive elements 14 are thus supplied in an intermittent manner to provide a de-icing type of function, whereas the resistive elements 15 are continuously supplied (when the device is in service) to provide an anti-icing type of function. The electrical returns contribute to the supply of heat near the leading edge.

The resistive elements 16, 17 of the second circuit 19 of the heating mat 12 are made in the same way. Their connection to the second electrical supply is different. The resistive elements 16, 17 are divided into two sets. A first set is composed of M resistive elements 16 ($M \geq 2$) providing the circulation of the heating current in one direction, for example from the blade root to the distal end. This first set is connected collectively to one of the terminals of the second electrical supply 23 of the aircraft (FIG. 4). The second group includes the resistive element(s) marked 17 for the circulation of the current in the other direction, connected also collectively to the other of the terminals of the second electrical supply 23 of the aircraft (FIG. 4). The second circuit 19 operates in this way as an anti-icer.

In the example shown in FIG. 1, the resistive elements 14, 16 are located one beside the other in the heating mat. The first set comprises N=5 resistive elements 14. The second set comprises M=2 resistive elements 16 one of which is located on the lateral edge of the extrados side mat and the other on the opposite lateral edge of the intrados side of the mat.

Other possible arrangements of the heating device are shown schematically in FIGS. 8 to 14, where the thick lines represent the cyclically supplied resistive elements 44, 74, 84, 94, 104 of the first set 18 whereas the broken lines serve to designate the collectively supplied elements 46, 56, 66, 76, 86, 96, 106 of the second set 19, the metallic shield 11 of the leading edge 6 as well as the return resistive elements 15 and 17 not being shown.

In the example of the version shown in FIG. 8, the N=7 resistive elements 44 of the first set 18 are located side by side in the heating mat covering the vicinity of the leading edge 6. The second set comprises M=1 resistive element 46 placed as an increase in thickness over the entire width of the mat. The element 46, which is continuously supplied is an anti-icer and supplies additional thermal power to the de-icer made by the elements 44 of the first set which are cyclically supplied, and avoids the zones of the de-icer becoming too cold between two supply periods.

The example of FIG. 9 differs from that of FIG. 8 in that the element 56 of the second set 19 extends over only a part of the width of the mat. This part of the width of the mat is that which covers the zone closest to the leading edge 6, in order to reinforce the heating in this zone which is most exposed to ice.

In the variant of the version shown in FIG. 10, the second set 19 comprises M=N-1=6 resistive elements 66 placed as an increase in thickness so as to cover the gaps between the adjacent elements 44 of the first set 18. By thus supplying additional power to these gaps, the risk of seeing cold points there is reduced.

Figure 11:
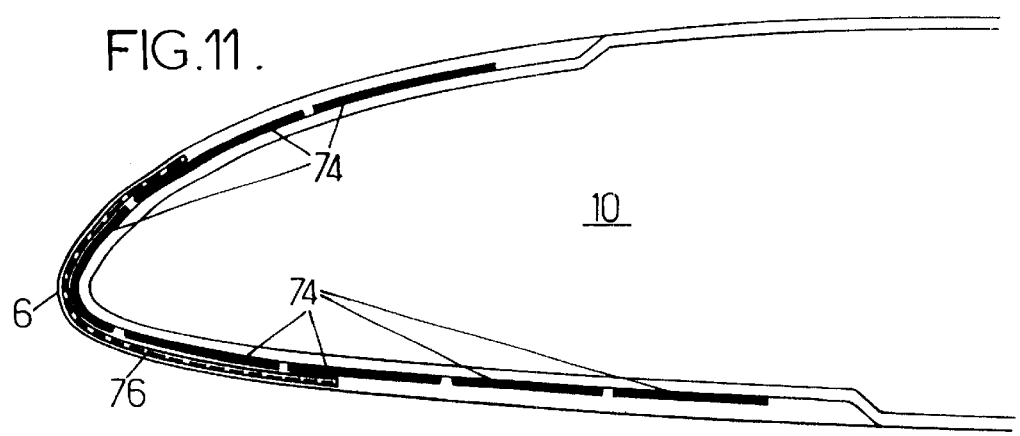

The example of the FIG. 11 version is comparable to that of FIG. 9, but it is more suitable when it is planned for the anti-icing function to be relatively more important in terms of power dissipated. In the same way the heating mat, the N=7 elements 74 of the first set 18 and the M=1 element 76 of the second set 19 have the same positions as in the case of FIG. 9, but the element 76 is located on the external side of the mat relative to the elements 74, in order to conduct the released heat more directly to the metallic armoring.

Figure 12:
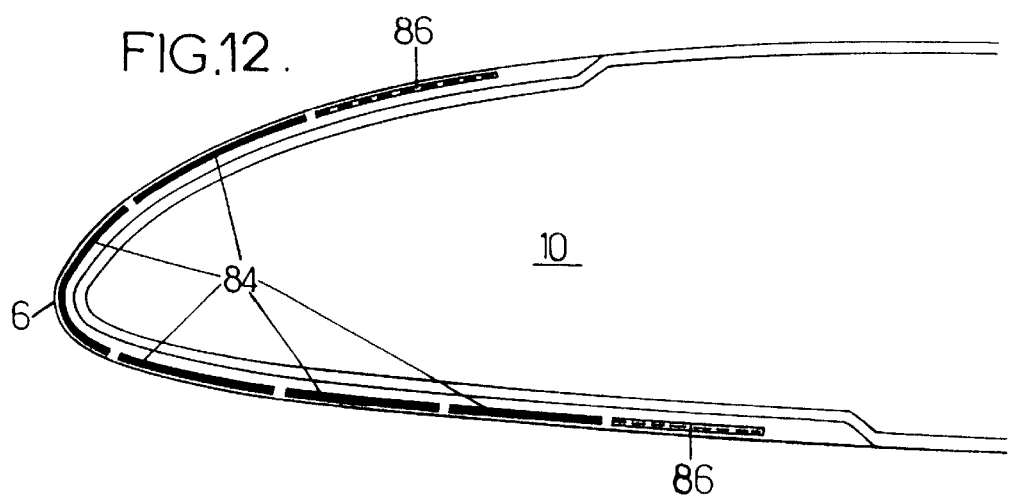
Figure 13:
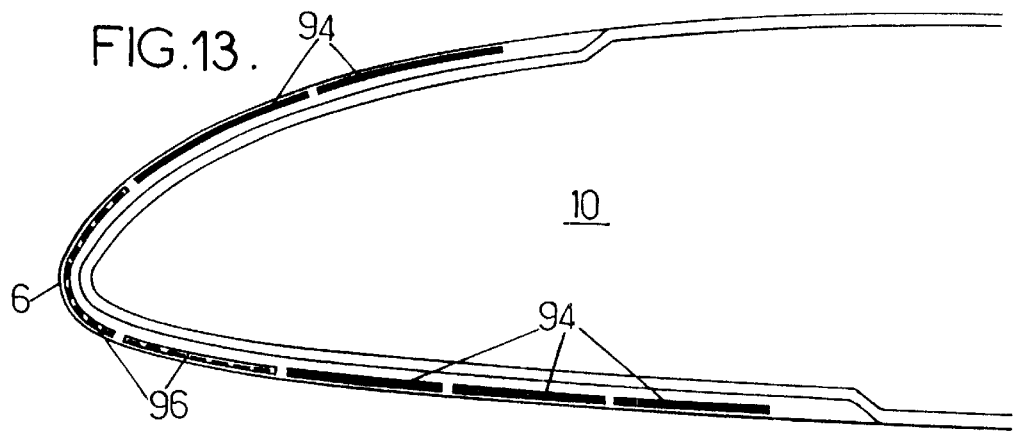

In the examples of FIGS. 12 and 13, the elements of the two sets (N=5, M=2) are located beside each other (in the same plane when the mat is flat). The example of FIG. 12 is comparable to that already drawn schematically in FIG. 1, the two elements 86 of the second set 19 producing supplementary power on the lateral edges of the mat which mainly provides a de-icing by means of the five elements 84 of the first set 18.

In the case of FIG. 13, the two elements 96 of the second set 19 have a resistance which is proportionally greater relative to that of the five elements 94 of the first set 18, so that the anti-icing function has a greater significance than in the case of FIG. 12. The elements 96 of the second set 19 are then closer to the leading edge 6 in order to dissipate the largest part of the power there, this anti-icer being completed, on its lateral edges, by a de-icer made of the elements 94 of the first set 18.

Figure 14:
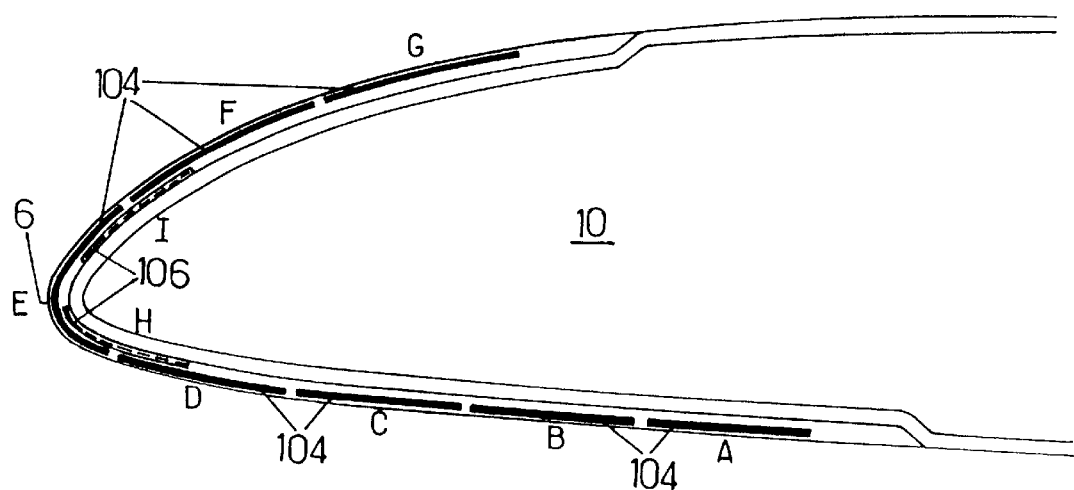

FIG. 14 shows another configuration of a device according to the invention. The N=7 elements 104 of the first set are placed as in the case of FIGS. 8 to 10, and are marked by the letters A to G from the intrados face to the extrados face of the blade, the element E being located at right angles to the leading edge 6. The second set comprises M=2 elements 106 placed as an increase in the thickness on the inner side of the heating mat. One of these elements, marked H, covers the gap between the elements D and E, whereas the other, marked 1, covers the gap between the elements E and F.

The return resistive elements 15 and 17 of the two de-icing 18 and anti-icing 19 circuits (not shown in FIGS. 8 to 14) are arranged relative to each other as a function of the blade design, for example:

in FIG. 8, the elements 15 and 17 are placed on the sides of the elements 44 and 46;

in FIG. 9, the elements 15 and 17 are arranged under the elements 44 and on the sides of the element 56;

in FIG. 10, the elements 15 are placed on the sides of the elements 44 and the elements 17 under the elements 44, on the sides of elements 66;

in FIGS. 11 and 14, the elements 15 and 17 are arranged respectively on and under the elements 74 and 104 and on the sides of elements 76 and 106; and in FIGS. 12 and 13, the elements 15 and 17 are placed respectively on the sides of the elements 86 and 94.

Of course, every relative arrangement of the resistive elements of the de-icing 18 and anti-icing 19 circuits other than that described above is conceivable as a function of the blade design and of the de-icing and anti-icing criteria required.

What is claimed is:

1. A heating device for an aerodynamic profile (10) including, incorporated into the aerodynamic profile in the vicinity of a leading edge (6) of the aerodynamic profile, several resistive elements (14,15;44;74;84;94;104) forming a first set (18) of resistive elements running approximately parallel to the leading edge, each of said resistive elements being provided at its proximal end with means of connection (28,30) to an electrical supply (20), so-called first electrical supply, the device comprising in addition a cyclical supply control (21,22) in order to supply, from the aforesaid first electrical supply (20), at least some of the resistive elements of the first set (18), one after the other, according to a specified sequence so that the first set of resistive elements forms a de-icing circuit, in which the heating device includes in addition a second set (19) of resistive elements (16, 17;46;56;66;76;86;96;106) incorporated into the aerodynamic profile in the vicinity of the leading edge (6) of the aerodynamic profile and running approximately parallel to the leading edge, each of said resistive elements being provided at its proximal end with means of connection (28,30) to a second electrical supply (23), all the resistive elements of the second set (19) being collectively and selectively supplied by the second electrical supply (23) so that the second set of resistive elements forms an anti-icing circuit, and in which the distal ends of each of the resistive elements of the first (18) and second (19) sets are connected to electrical returns to the first (20) and second (23) electrical supplies, the electrical returns of the first set being independent of the electrical returns of the second set.

2. A heating device according to claim 1, in which the resistive elements of the first set (18) and/or the resistive elements of the second set (19) are made in metallic material.

3. A heating device according to claim 1, in which the resistive elements of the first set (18) and/or the resistive elements of the second set (19) are made of electrically conducting fibres of composite material running approximately parallel to the leading edge (6) of the profile.

4. A heating device according to any of claim 1, in which the resistive elements (14–17) of the first set (18) and of the second set (19) are arranged one beside the other in a heating mat (12) that covers the vicinity of the leading edge (6), at least one resistive element (86) of the second set (19) being located along an lateral edge of the heating mat.

5. A device according to claim 4, in which the second set (19) comprises at least one resistive element (86) located along a lateral edge of the heating mat (12) and at least one resistive element (86) located along the opposite lateral edge of the heating mat.

6. A device according to any of claim 1, in which the resistive elements of the first set (18) and the resistive elements of the second set (19) are arranged one beside the other in a heating mat (12) covering the vicinity of the leading edge (6), at least one element (96) of the second set (19) being located closer to the leading edge (6) than the elements of the first set (18).

7. A device according to any of claim 1, in which the elements of the first set (18) are arranged one beside the other in a heating mat (12) covering the vicinity of the leading edge (6), and at least one resistive element of the second set (19) is superimposed on the elements of the first set (18) in the heating mat (12).

8. A device according to claim 7, in which said second set (19) is composed of a resistive element (46) covering approximately all the width of the heating mat (12), by superposition of the resistive elements (44) of the first set (18).

9. A device according to claim 7, in which at least one resistive element (56) of the second set (19) is superimposed on a part of the width of the heating mat (12) located at right angles to the leading edge (6).

10. A device according to claim 7, in which at least one resistive element (66) of the second set (19) is placed so as to cover a gap separating two adjacent resistive elements (44) of the first set (18).

11. A device according to claim 1, in which some of the returns (15) of the first set (18) of resistive elements are electrically connected to each other, these returns being made in metallic material or made of electrically conducting composite fibre material.

12. A device according to claim 11, in which the returns electrically connected to each other of the first set (18) are arranged on the aerodynamic profile.

* * * * *